(12) United States Patent
Tominaga

(10) Patent No.: US 10,507,695 B2
(45) Date of Patent: Dec. 17, 2019

(54) BIAS TIRE AND METHOD FOR MANUFACTURING SAME

(71) Applicant: BRIDGESTONE CORPORATION, Tokyo (JP)

(72) Inventor: Keisuke Tominaga, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 92 days.

(21) Appl. No.: 15/302,714

(22) PCT Filed: Apr. 22, 2015

(86) PCT No.: PCT/JP2015/002194
§ 371 (c)(1),
(2) Date: Oct. 7, 2016

(87) PCT Pub. No.: WO2015/166649
PCT Pub. Date: Nov. 5, 2015

(65) Prior Publication Data
US 2017/0036484 A1 Feb. 9, 2017

(30) Foreign Application Priority Data

Apr. 28, 2014 (JP) .................................. 2014-092866

(51) Int. Cl.
*B60C 9/00* (2006.01)
*B60C 9/06* (2006.01)
(Continued)

(52) U.S. Cl.
CPC ................ *B60C 9/06* (2013.01); *B29D 30/30* (2013.01); *B60C 9/04* (2013.01); *B60C 2009/0215* (2013.01); *B60C 2009/0408* (2013.01)

(58) Field of Classification Search
CPC ..... B60C 9/18; B60C 2009/0408; B60C 3/06; B60C 9/06; B29D 2030/423
See application file for complete search history.

(56) References Cited

U.S. PATENT DOCUMENTS

| 1,199,264 A | 9/1916 | Grabau |
| 1,350,995 A | 8/1920 | Grabau |

(Continued)

FOREIGN PATENT DOCUMENTS

| DE | 8813969 U1 | 12/1988 |
| EP | 0239160 A2 | 9/1987 |

(Continued)

OTHER PUBLICATIONS

International Search Report of PCT/JP2015/002194, dated Jul. 21, 2015. [PCT/ISA/210].

*Primary Examiner* — Justin R Fischer
(74) *Attorney, Agent, or Firm* — Sughrue Mion, PLLC

(57) ABSTRACT

Provided is a bias tire includes a carcass extending between a pair of bead portions, a pair of sidewall portions, a tread, and a reinforcement layer (5), formed by cords (5Cb), disposed so as to cover at least a portion of a tire circumferential edge (BEi) on the inner side, in the tire radial direction, of the innermost ply (2Bi) of the carcass in a tire half portion (HFa) on a side where, as a cord (Cb) of a tire circumferential end on the inner side, in the tire radial direction, of the innermost ply (2Bi) approaches the tire circumferential edge on the inner side, in the tire radial direction, of the innermost ply (2Bi) along the tire circumferential direction, the cord (Cb) is inclined so as to separate from the tire equator (CL).

10 Claims, 5 Drawing Sheets

(51) Int. Cl.
  *B29D 30/30* (2006.01)
  *B60C 9/04* (2006.01)
  *B60C 9/02* (2006.01)

(56) References Cited

U.S. PATENT DOCUMENTS

| | | | |
|---|---|---|---|
| 4,029,511 A * | 6/1977 | Carson | B29C 33/60 |
| | | | 106/38.22 |
| 4,226,654 A | 10/1980 | Young | |
| 4,810,317 A | 3/1989 | Lang | |
| 5,062,462 A | 11/1991 | Rye et al. | |
| 5,392,830 A * | 2/1995 | Janello | B60C 9/09 |
| | | | 152/543 |

FOREIGN PATENT DOCUMENTS

| | | | |
|---|---|---|---|
| FR | 2389483 A1 | | 12/1978 |
| GB | 1115546 | * | 5/1968 |
| GB | 1425224 | * | 2/1976 |
| JP | 62-225404 A | | 10/1987 |
| JP | 63-158235 A | | 7/1988 |
| JP | 4-182119 | * | 6/1992 |
| JP | 04173238 | * | 6/1992 |
| JP | 6-55665 | * | 3/1994 |

* cited by examiner

BIAS TIRE AND METHOD FOR MANUFACTURING SAME

CROSS REFERENCE TO RELATED APPLICATIONS

This application is a National Stage of International Application No. PCT/JP2015/002194 filed Apr. 22, 2015, claiming priority based on Japanese Patent Application No. 2014-092866, filed Apr. 28, 2014, the contents of all of which are incorporated herein by reference in their entirety.

TECHNICAL FIELD

This disclosure relates to a bias tire, and a method for manufacturing the same, that includes, as a frame, a carcass made up of at least one ply extending between a pair of bead portions, a cord of the ply being inclined in a range of less than 90° relative to the tire equator, and includes a pair of sidewall portions on the outer side, in the tire radial direction, of the bead portions and a tread extending between the sidewall portions.

BACKGROUND

Conventionally, a bias tire has no inner liner adhered to the innermost ply of the carcass, unlike a radial tire that has plies with radially extending cords. Accordingly, at the inner surface of a bias tire, the innermost ply of the carcass is exposed.

SUMMARY

Technical Problem

In such a bias tire, a partial crack ("joint crack") sometimes occurs at the joint where one end, in the tire circumferential direction, of the innermost ply exposed at the inner surface of the tire overlaps the other end. It would therefore be helpful to provide a bias tire that avoids the occurrence of a joint crack in the innermost ply of the carcass and a method for manufacturing a bias tire such that a bias tire that avoids the occurrence of a joint crack in the innermost ply of the carcass can easily be obtained.

Solution to Problem

Upon thorough examination, I discovered that such a joint crack is caused by the presence of a mold release agent between the ends at the joint of the innermost ply of the carcass. Generally, a mold release agent refers to an agent that, in the tire manufacturing process, is applied to the inner surface of an unvulcanized tire (also referred to below as a "green tire"), i.e. to the innermost ply of the carcass before vulcanization, to provide the green tire with good releasability from the vulcanization bladder after vulcanization.

Furthermore, upon examining means for avoiding the interposition of the mold release agent at the joint, I confirmed that in a bias tire in which the cord angle of the ply constituting the carcass is in a range of less than 90° relative to the tire equator, the cord angle changes when the green tire expands in diameter, but along with this change in cord angle; the positional relationship of the tire circumferential ends of the ply that overlap at the joint also changes. I confirmed that as a result, the mold release agent applied to the innermost ply is trapped between the ends of the innermost ply.

After further examination, I discovered that the aforementioned joint crack can be avoided by providing the below-described reinforcement layer at the joint of the innermost ply of the carcass, thereby completing a bias tire according to this disclosure.

I provide the following.

(1) My bias tire comprises:
a carcass, as a frame, made up of at least one ply extending between a pair of bead portions, a cord of the ply being inclined in a range of less than 90° relative to a tire equator;
a pair of sidewall portions on an outer side, in a tire radial direction, of the bead portions; and
a tread extending between the sidewall portions; wherein
a reinforcement layer formed by a plurality of cords is disposed so as to cover at least a portion of a tire circumferential edge on an inner side, in the tire radial direction, of an innermost ply of the carcass in a tire half portion on a side where, as a cord of a tire circumferential end on the inner side, in the tire radial direction, of the innermost ply approaches the tire circumferential edge on the inner side, in the tire radial direction, of the innermost ply along the tire circumferential direction, the cord is inclined so as to separate from the tire equator. A bias tire with such a structure according to this disclosure can avoid the occurrence of a joint crack in the innermost ply of the carcass.

In this disclosure, the "outer side in the tire radial direction" refers to the "tire outer surface side", and the "inner side in the tire radial direction" refers to the "tire inner surface side".

(2) The reinforcement layer is preferably disposed across at least 70% of a shoulder inner surface area that, in a cross-sectional view in a tire width direction, is sandwiched between a tire inner surface position separated from a bead baseline outward in the tire radial direction by 20% of a tire cross-sectional height and a tire inner surface position corresponding to a tire width direction center between a tread ground contact edge and the tire equator. According to this structure, the occurrence of a joint crack in the innermost ply of the carcass can more reliably be avoided.

The "tread ground contact edge" refers to the tire widthwise outermost position, in the tread width direction, of the tread surface. The "tread surface" refers to the entire outer circumferential surface of the tire that comes into contact with the road surface when the tire is attached to an applicable rim, filled to a prescribed internal pressure, and rolled while being placed under a load corresponding to the maximum load capability.

The "applicable rim" refers to an approved rim prescribed by the standards below in accordance with tire size. "Prescribed internal pressure" refers to air pressure prescribed by the standards below in accordance with the maximum load capability. The standards are effective industrial standards in areas where tires are produced or used, such as the "approved rim" in the JATMA YEAR BOOK in Japan, the "Measuring Rim" in the ETRTO STANDARDS MANUAL in Europe, or the "Design Rim" in the TRA YEAR BOOK in the United States.

(3) A thickness of the reinforcement layer is preferably 0.1 mm or greater to 5.0 mm or less.

According to this structure, the occurrence of a joint crack in the innermost ply of the carcass can more reliably be avoided, while suppressing an excessive increase in weight of the tire.

(4) A width of the reinforcement layer is preferably 5 mm or greater to 80 mm or less.

According to this structure, the occurrence of a joint crack in the innermost ply of the carcass can more reliably be avoided, while suppressing an excessive increase in weight of the tire.

(5) The reinforcement layer preferably comprises intersecting cords, or (6) the reinforcement layer preferably comprises parallel cords, and an extending direction of the cords preferably differs from an extending direction of the tire circumferential edge on the inner side, in the tire radial direction, of the innermost ply.

According to these structures, the occurrence of a joint crack in the innermost ply of the carcass can more reliably be avoided.

The arrangement, size, and the like of the reinforcement layer in this disclosure are assumed to be for a state in which the tire is mounted on an applicable rim with zero internal pressure and no load applied.

(7) In a method for manufacturing my bias tire, the bias tire is as described above in (1), and the method comprises, in order: winding the carcass around a drum; disposing a reinforcement layer, formed by a plurality of cords, so as to cover at least a portion of a tire circumferential edge on an inner side, in the tire radial direction, of an innermost ply of the carcass in a tire half portion on a side where, as a cord of a tire circumferential end on the inner side, in the tire radial direction, of the innermost ply approaches the tire circumferential edge on the inner side, in the tire radial direction, of the innermost ply along the tire circumferential direction, the cord is inclined so as to separate from the tire equator; coating a surface, on a tire inner surface side, of the innermost ply and the reinforcement layer with a mold release agent; and vulcanizing a green tire after diameter expansion in a vulcanizer. According to the method for manufacturing a bias tire of this disclosure, a bias tire that avoids the occurrence of a joint crack in the innermost ply of the carcass can easily be obtained.

Note that by setting the reinforcement layer in the method for manufacturing a bias tire described in (7) to be a reinforcement layer satisfying (2) to (6) above, the occurrence of a joint crack in the innermost ply of the carcass can more reliably be avoided.

Advantageous Effect

According to this disclosure, it is possible to provide a bias tire that avoids the occurrence of a joint crack in the innermost ply of the carcass and a method for manufacturing a bias tire such that a bias tire that avoids the occurrence of a joint crack in the innermost ply of the carcass can easily be obtained.

DETAILED DESCRIPTION

The following first describes, in detail, exemplary embodiments of my bias tire (also referred to below simply as a "tire") with reference to the drawings.

Figure 1:
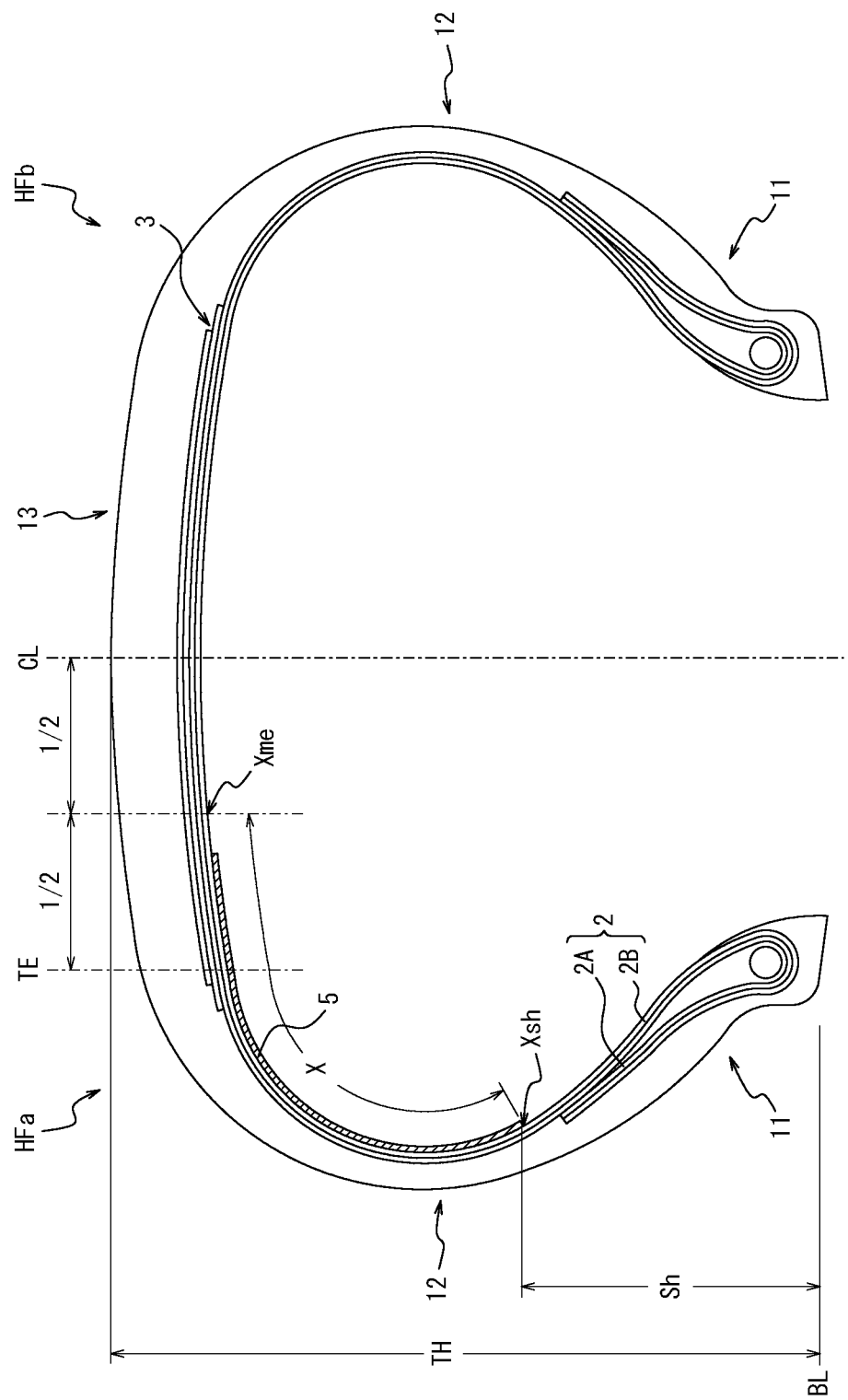
FIG. 1 is a cross-sectional view, in the tire width direction, of a bias tire according to one of the disclosed embodiments.

FIG. 1 illustrates a cross-section, in the tire width direction, of the tire according to one of the disclosed embodiments. This tire is a bias tire comprising, as a frame; a carcass (bias carcass) 2 made up of at least one ply extending between a pair of bead portions 11, cords of the ply being inclined in a range of less than 90° relative to the tire equator CL; a pair of sidewall portions 12 on a tire radial outer side of the bead portions 11; and a tread 13 extending between the sidewall portions 12. The carcass 2 of this embodiment is made up of two layers: a tire radial direction outer ply 2A positioned outermost in the tire radial direction, and a tire radial direction inner ply 2B positioned innermost in the tire radial direction (also referred to below as the "innermost ply 2B"). The innermost ply 2B is exposed at the inside of the tire.

Figure 2:
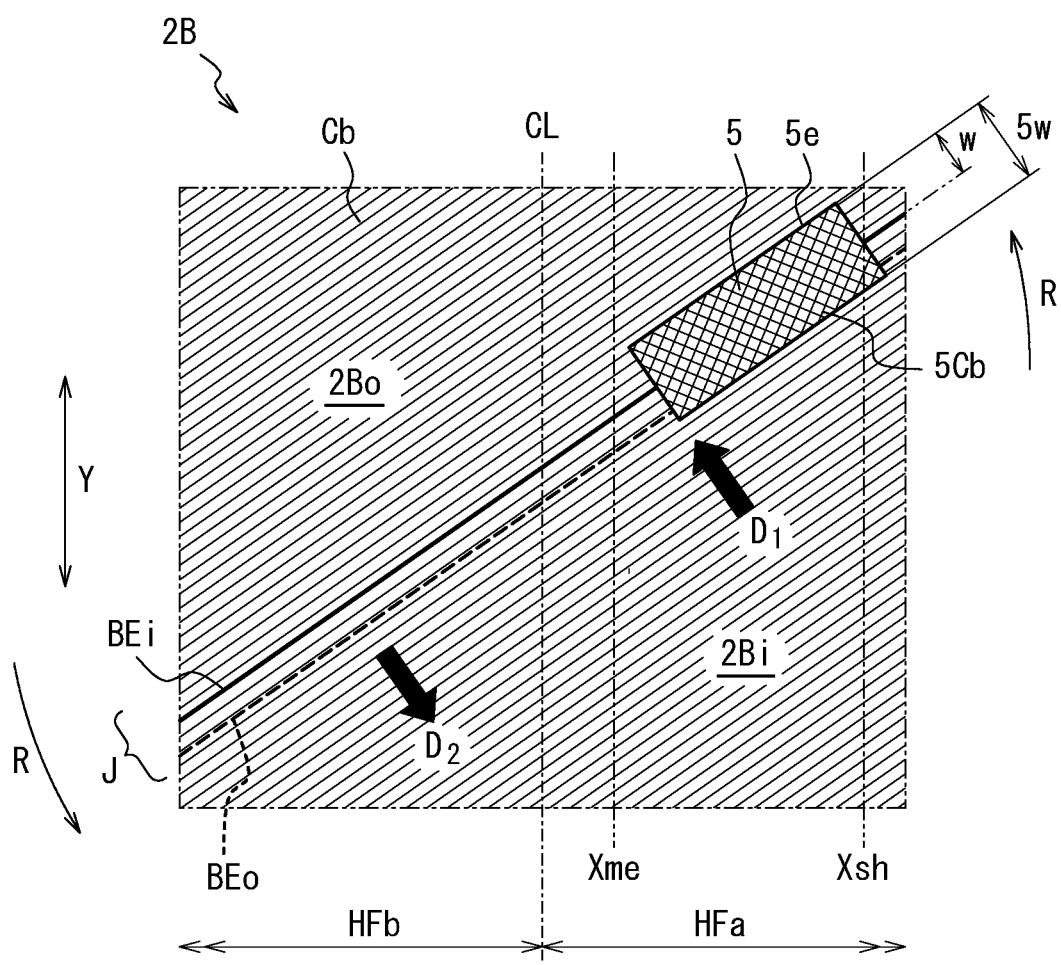
FIG. 2 is a partial developed view of the innermost ply at the tire inner surface of the tire as viewed from the tire inner surface side.

FIG. 2 is a partial developed view of the innermost ply 2B at the inner surface of the tire. As described above, the carcass 2 is a bias carcass, and a cord Cb of the innermost ply 2B extends at an angle relative to the tire equator CL, for example in a range of 25' or greater to 40° or less (30° in the illustrated example). In the innermost ply 2B that is wound in the tire circumferential direction (the Y-direction in the drawing), an end 2Bi on the inner side in the tire radial direction is overlaid on an end 2Bo on the outer side in the tire radial direction, and a joint J is formed continuously in a direction inclined relative to the tire circumferential direction. In this embodiment, a reinforcement layer 5 having a plurality of cords is disposed so as to cover a portion of a tire radial direction inner edge BEi of the innermost ply 2B.

In the bias tire of this disclosure, at the joint J formed by overlapping one of the tire circumferential ends 2Bo or 2Bi of the innermost ply 2B of the carcass with the other end 2Bi or 2Bo, a reinforcement layer 5 formed by a plurality of cords 5Cb is disposed so as to cover at least a portion of a tire circumferential edge BEi on the inner side of the innermost ply 2B in the tire radial direction in a tire half portion HFa on a side where, as the cord Cb of the end 2Bi on the inner side of the innermost ply 2B in the tire radial direction approaches the edge BEi along the tire circumferential direction (the Y-direction in the drawing), the cord Cb is inclined so as to separate from the tire equator CL.

As described above, a bias tire generally does not have an inner liner adhered adjacent to the inner side, in the tire radial direction, of the innermost layer 2B of the carcass. Accordingly, in the tire manufacturing process, a mold release agent applied to the inner surface of a green tire before vulcanization is applied directly onto the innermost ply 2B of the carcass to provide the green tire with good releasability between the tire inner surface and the vulcanization bladder after vulcanization.

Furthermore, in a bias tire, due to the cords Cb of the plies 2A and 2B that form the carcass extending at an angle of less than 90° relative to the tire equator CI, i.e. at an inclination with respect to both the tire equator CL and the tire width direction, the inclination angle of the cord Cb relative to the tire equator CL changes around the time of diameter expansion during the process of manufacturing the tire. In other words, in the exemplary embodiment illustrated in FIG. 2

(FIG. 2 being assumed below to illustrate a green tire before diameter expansion), the cord Cb of the innermost ply 2B changes in angle in the direction of the arrow R in FIG. 2, i.e. in a direction that approaches the direction along the tire equator CL, in accordance with diameter expansion of the green tire. As a result, the innermost ply 2B follows this movement of the cord Cb and moves from the position before diameter expansion in the directions indicated by arrows $D_1$ and $D_2$ in FIG. 2.

In greater detail, a tire half portion HFa is on a side where, as the cord Cb of an end 2Bi on the inner side, in the tire radial direction, of the innermost ply 2B approaches the tire circumferential edge BEi on the inner side, in the tire radial direction, of the innermost ply 2B along the tire circumferential direction, the cord Cb is inclined so as to separate from the tire equator CL. In this tire half portion HFa, the end 2Bi on the inner side, in the tire radial direction, of the innermost ply 2B moves in the direction D away from the edge BEo on the outer side so as to encroach onto the end 2Bo on the outer side, Conversely, in the other tire half portion HFb, the end 2Bi on the inner side moves in the direction $D_2$ to approach the edge BEo on the outer side so as to pull the end 2Bo on the outer side.

As described above, in a green tire before vulcanization, a mold release agent is applied to the inner surface of the green tire, i.e. the surface of the innermost ply of the carcass, to provide good releasability between the tire inner surface and the vulcanization bladder after vulcanization. Accordingly, when the green tire expands in diameter in this state, in the tire half portion HFa where the end 2Bi on the inner side, in the tire radial direction, of the innermost ply moves in the direction away from the edge BEo on the outer side (in FIG. 2, the direction of the arrow $D_1$), the end 2Bi on the inner side moves while trapping the mold release agent applied onto the end 2Bo on the outer side. The green tire is then vulcanized.

Figure 3A:
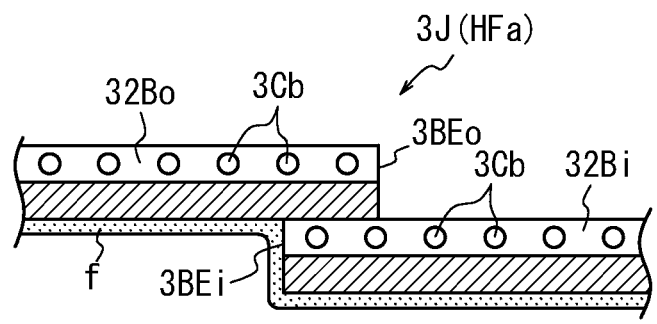
FIGS. 3A, 3B and 3C are schematic cross-sectional diagrams illustrating the joint condition of the innermost ply in a Comparative Example Tire.
Figure 3B:
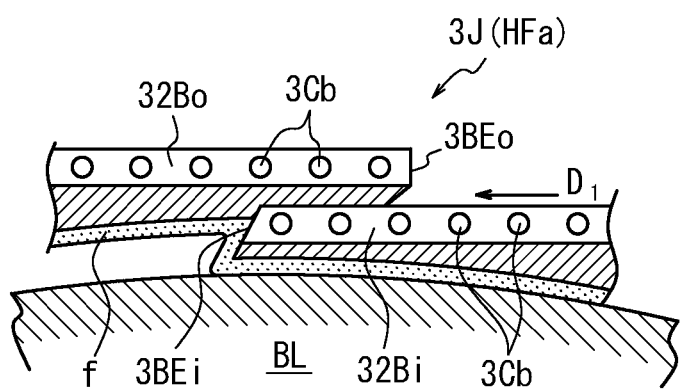
Figure 3C:
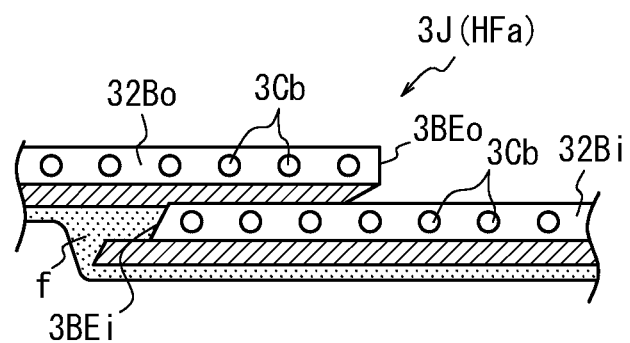

For example, FIG. 3 is a cross-sectional view of the joint 3J (on the tire half portion HFa side) of the innermost ply in the bias tire of a Comparative Example when cutting along a plane orthogonal to the joint 3J. While the surface of the innermost ply is coated with mold release agent f, as illustrated in FIG. 3A, the inclination angle of the cord 3Cb of the innermost ply relative to the tire equator CL changes upon the green tire expanding in diameter due to the bladder BL, as illustrated in FIG. 3B. Furthermore, along with this change in cord angle, the end 2Bi on the inner side, in the tire radial direction, of the innermost ply moves in the direction of the arrow $D_1$ away from the edge BEo on the outer side and onto the end 32Bo on the outer side while trapping the mold release agent f applied thereon. As a result, as illustrated in FIG. 3C, the mold release agent f remains between one end 32Bo and the other end 32Bi of the innermost ply, giving rise to a joint crack in the product tire.

Figure 4A:
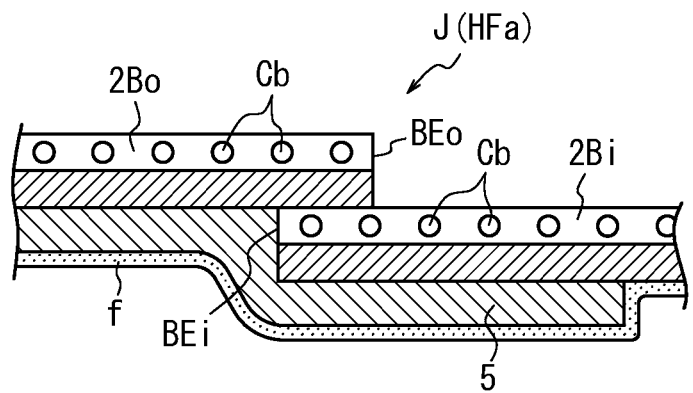
FIGS. 4A, 4B and 4C are schematic cross-sectional diagrams illustrating the joint condition of the innermost ply in the tire of FIG. 1.

Therefore, in my bias tire, the reinforcement layer 5 formed by a plurality of cords 5Cb (omitted from FIGS. 4A to 4C) is disposed so as to cover at least a portion of the tire circumferential edge BEi on the inner side, in the tire radial direction, of the innermost ply 2B in the tire half portion HFa on a side where, as the cord Cb of the end 2Bi on the inner side, in the tire radial direction, of the innermost ply 2B of the carcass approaches the edge BEi along the tire circumferential direction, the cord Cb is inclined so as to separate from the tire equator CL, As a result, as illustrated in FIG. 4A, the mold release agent does not directly coat the surface of the end 2Bo on the outer side in the tire radial direction, which is covered by the end 2Bi on the inner side in the tire radial direction, when the green tire expands in diameter.

Figure 4B:
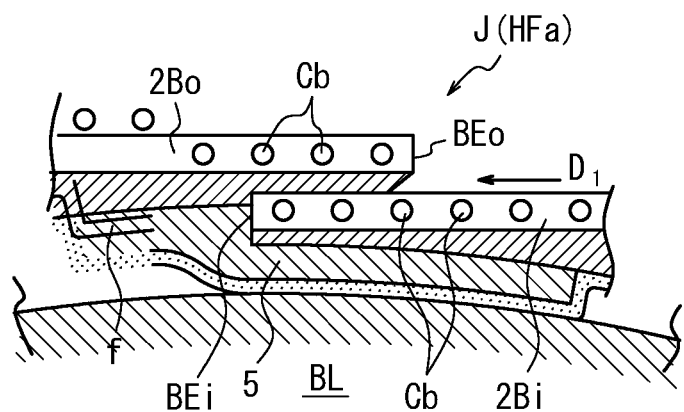
Figure 4C:
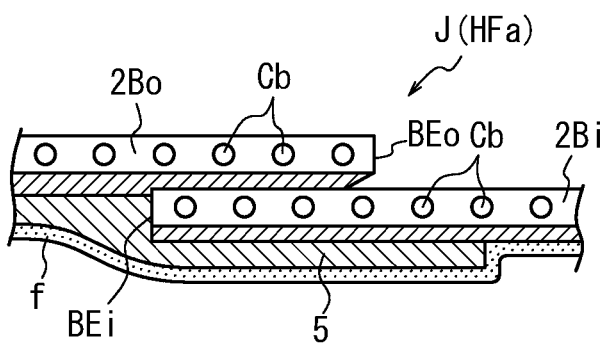

Accordingly, as illustrated in FIG. 4B, when the green tire expands in diameter due to the bladder BL, the mold release agent f is not trapped even if the end 32Bi on the inner side, in the tire radial direction, of the innermost ply moves onto the end 2Bo on the outer side due to a change in angle of the cord Cb. As a result, as illustrated in FIG. 4C, the mold release agent f does not remain between the end 2Bo on the outer side and the end 2Bi on the inner side of the innermost ply in the green tire, and hence does not remain in the product tire, thereby avoiding the occurrence of a joint crack.

As seen in FIG. 1, the reinforcement layer 5 is preferably disposed across at least 70% of a shoulder inner surface area X that, in a cross-sectional view in a tire width direction, is sandwiched between a tire inner surface position Xsh separated from a bead baseline BL outward in the tire radial direction by 20% of a cross-sectional height TH of the tire and a tire inner surface position Xme corresponding to a tire width direction center between a tread ground contact edge IF and the tire equator CL.

While the diameter expansion ratio when the green tire expands in diameter is relatively small around the bead portion 11, the diameter expansion ratio is largest in the central area of the tread 13 near the tire equator CL. Therefore, the above-described phenomenon of trapping the mold release agent is most salient near the aforementioned shoulder inner surface area X positioned between these areas.

Hence, according to the aforementioned structure, trapping of the mold release agent at the time that the green tire expands in diameter can be suppressed, thereby more reliably avoiding the occurrence of a joint crack. The reinforcement layer 5 is more preferably disposed across 80% or more of the shoulder inner surface area X.

The thickness of the reinforcement layer 5 is preferably 0.1 mm or greater to 5.0 mm or less. By setting the thickness within this range, an excessive increase in tire weight and an adverse effect on uniformity can be suppressed, while more reliably avoiding trapping of the mold release agent and hence the occurrence of a joint crack. The thickness is more preferably 1.0 mm or less.

The width 5w of the reinforcement layers is preferably set to be 5 mm or greater to 80 mm or less in order similarly to suppress an excessive increase in tire weight and an adverse effect on uniformity, while more reliably avoiding trapping of the mold release agent and hence the occurrence of a joint crack. The width 5w is more preferably 10 mm or greater to 60 mm or less.

Furthermore, setting the width 5w of the reinforcement layer 5 to be within the aforementioned range and setting the minimum distance w from the tire circumferential edge BEi on the inner side, in the tire radial direction, of the innermost ply 29 to the edge Sc of the reinforcement layer 5 over the end 2Bo on the outer side, in the tire radial direction, of the innermost ply 2B to 3 mm or greater is more preferable in order to more reliably avoid trapping of the mold release agent.

Figure 5:
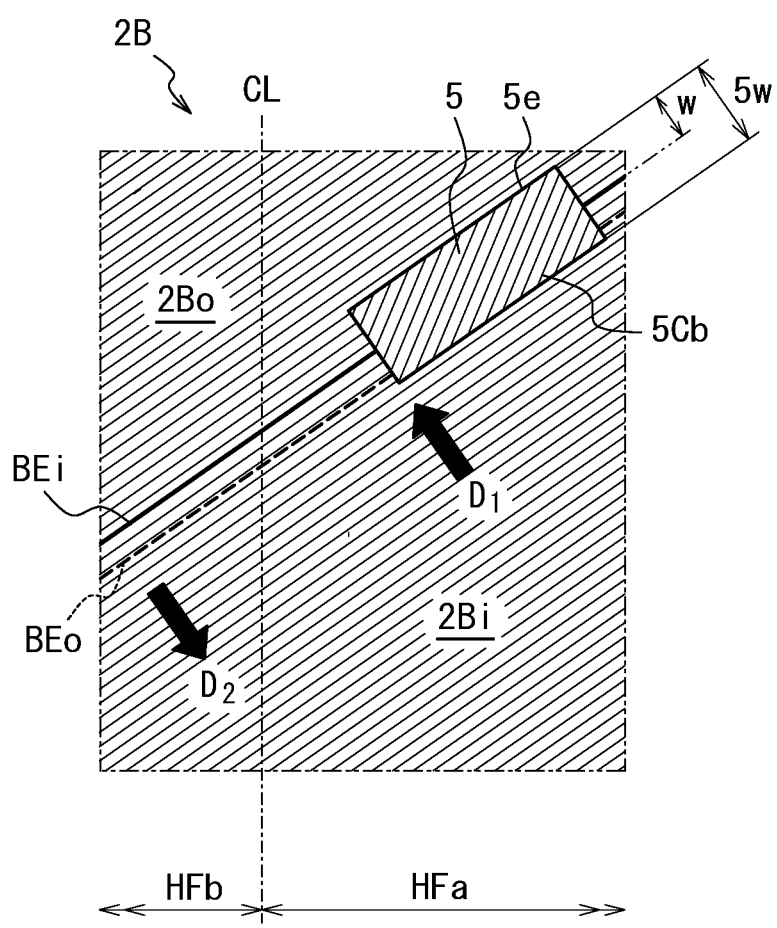
FIG. 5 is a partial developed view of the innermost ply of the tire according to another of the disclosed embodiments as viewed from the tire inner surface side.

In addition to the cords 5Cb of the reinforcement layer 5 intersecting as illustrated in FIG. 2, the cords 5Cb may be disposed in parallel, for example as illustrated in FIG. 5. When disposing the cords 5Cb in parallel, the extending direction of the cords 5Cb preferably differs from the extending direction of the tire circumferential edge BEi on the inner side, in the tire radial direction, of the innermost ply 2B.

In the case that the cords Kb are intersecting, while it does not matter which one, at least one of the extending directions of the cords 5Cb is more preferably different from the extending direction of both the edge BEi of the innermost ply 2B and the cord Cb of the innermost ply 2B.

According to these structures, it becomes more difficult for the reinforcement layer 5 to follow the change in angle in the cord Cb of the innermost ply 2B. Hence, trapping of the mold release agent can more reliably be suppressed. At least one surface of the reinforcement layer 5, in particular the surface on the innermost ply 2B side that is attached to the innermost ply 2B, is preferably covered in rubber or formed from rubber-coated cords.

Cords made from nylon, PET, or the like may be used as the cords Cb of the carcass plies.

Cords made from nylon, PET, or the like may also be used as the cords 5Cb of the reinforcement layer 5.

My bias tire can, for example, be suitably used in a tire for a cart or the like. In the bias tire according to the embodiment in FIG. 1, a carcass protective layer is disposed on the outer side, in the tire radial direction, of the two-layer carcass, but the belt structure of a bias tire according to this disclosure is not limited to this example.

Next, an exemplary embodiment of my method for manufacturing a bias tire is described.

My manufacturing method includes, in this order: winding a carcass 2 around a drum; disposing a reinforcement layer 5, formed by a plurality of cords 5C b, so as to cover at least a portion of a tire circumferential edge BEi on an inner side, in the tire radial direction, of an innermost ply 2B of the carcass in a tire half portion HFa on a side where, as a cord Cb of a tire circumferential end 2Bi on the inner side, in the tire radial direction, of the innermost ply 2B approaches the tire circumferential edge BEi on the inner side, in the tire radial direction, of the innermost ply 2B along the tire circumferential direction, the cord Cb is inclined so as to separate from the tire equator CL; coating a surface; on a tire inner surface side; of the innermost ply 2B and the reinforcement layer 5 with a mold release agent f; and vulcanizing a green tire after diameter expansion in a vulcanizer.

In this way, according to my manufacturing method to dispose the aforementioned reinforcement layer 5 so as to cover at least a portion of the joint J in the innermost ply 2B at the half portion HFa, more specifically the edge BEi on the inner side in the tire radial direction, before coating the inner surface of the tire with the mold release agent f, trapping of the mold release agent at the joint J can be suppressed, yielding a bias tire that avoids the occurrence of a joint crack.

My method for manufacturing a bias tire can also greatly reduce the cost of materials and the processing costs as compared, for example, to a known manufacturing method that includes, in this order: winding a carcass around a drum; attaching masking tape to at least a portion on the edge, on the inner side in the tire radial direction, of the innermost ply in the tire half portion HFa; coating the surface of the innermost ply and the masking tape with the mold release agent f; vulcanizing a green tire after diameter expansion in a vulcanizer; peeling off the masking tape from the tire after vulcanization; and applying, by hand, precured rubber to the portion where the masking tape was peeled off.

EXAMPLES

Example 1

The following describes Example 1 of this disclosure; however, this disclosure is in no way limited to this Example.

Example Tires and a Comparative Example Tire were produced with the specifications listed in Table 1. Each sample tire was a bias tire that includes, as a frame, a carcass made up of two plies extending between a pair of bead portions, a cord of the ply being inclined in a range of less than 90° relative to the tire equator, and includes a pair of sidewall portions on the outer side, in the tire radial direction, of the bead portions and a tread extending between the sidewall portions. As illustrated in Table 1, the existence of a joint crack was determined for a variety of placement locations and sizes of the reinforcement layer in the sample tires, Comparative Example 1 in Table 1 is a bias tire without a reinforcement layer.

TABLE 1

|  | Material | Cord diameter | Number of cords implanted (cords/ 50 mm) | Weave type | Rubber coating | Proportion of area X occupied (%) | Width (mm) | Thickness (mm) | Joint crack present |
|---|---|---|---|---|---|---|---|---|---|
| Comparative Example 1 | — | — | — | — | — | 0 | — | — | yes |
| Example 1 | nylon | 490 | 48 | plain weave | both sides | 70 | 55 | 0.71 | no |
| Example 2 | nylon | 490 | 39 | plain weave | both sides | 70 | 55 | 0.71 | no |
| Example 3 | nylon | 490 | 39 | plain weave | both sides | 80 | 55 | 0.71 | no |
| Example 4 | nylon | 470 | 39 | plain weave | both sides | 80 | 55 | 0.71 | no |
| Example 5 | nylon | 470 | 39 | plain weave | both sides | 100 | 55 | 0.71 | no |
| Example 6 | nylon | 470 | 39 | plain weave | one side | 80 | 4 | 0.46 | no |
| Example 7 | nylon | 470 | 39 | plain weave | one side | 80 | 5 | 0.46 | no |
| Example 8 | nylon | 470 | 39 | plain weave | one side | 80 | 20 | 0.46 | no |
| Example 9 | nylon | 470 | 39 | plain weave | one side | 80 | 40 | 0.46 | no |
| Example 10 | nylon | 470 | 39 | plain weave | one side | 80 | 55 | 0.46 | no |

TABLE 1-continued

| | Material | Cord diameter | Number of cords implanted (cords/ 50 mm) | Weave type | Rubber coating | Proportion of area X occupied (%) | Width (mm) | Thickness (mm) | Joint crack present |
|---|---|---|---|---|---|---|---|---|---|
| Example 11 | nylon | 470 | 39 | plain weave | one side | 80 | 20 | 1.00 | no |
| Example 12 | nylon | 470 | 39 | plain weave | one side | 80 | 20 | 5.00 | no |
| Example 13 | nylon | 470 | 39 | plain weave | one side | 80 | 20 | 5.20 | no |
| Example 14 | nylon | 470 | 39 | blind weave | one side | 80 | 20 | 0.46 | no |

A joint crack occurred in the Comparative Example Tire, whereas no joint crack occurred in the bias tires of this disclosure.

REFERENCE SIGNS LIST

2 Carcass
2A Ply on the outer side, in the tire radial direction, of the carcass
2B Ply on the inner side, in the tire radial direction, of the carcass (innermost ply)
2Bo End, on the outer side in the tire radial direction, of the innermost ply
2Bi End, on the inner side in the tire radial direction, of the innermost ply
3 Belt
5 Reinforcement layer
11 Bead portion
12 Sidewall portion
13 Tread
f Mold release agent
BEo Tire circumferential edge, on the outer side in the tire radial direction, of the innermost ply
BEi Tire circumferential edge, on the inner side in the tire radial direction, of the innermost ply
BL Bead base
Cb Ply cords
CL Tire equator
HFa, HFb Tire half portion
J Joint
TH Cross-sectional height of tire

The invention claimed is:

1. A bias tire comprising:
a carcass, as a frame, made up of at least one ply extending between a pair of bead portions, a cord of the ply being inclined in a range of less than 90° relative to a tire equator;
a pair of sidewall portions on an outer side, in a tire radial direction, of the bead portions; and
a tread extending between the sidewall portions,
wherein a reinforcement layer formed by a plurality of cords is disposed so as to cover at least a portion of a tire circumferential edge on an inner side, in the tire radial direction, of an innermost ply of the carcass,
wherein the reinforcement layer is formed only in a tire half portion on a side where the tire circumferential edge on the inner side of the innermost ply is inclined in a way that a cord of a tire circumferential end on the inner side of the innermost ply moves away from the tire equator as the cord extends further in the tire circumferential direction towards the tire circumferential edge on the inner side of the innermost ply, and
wherein a cord of the innermost ply of the carcass extends at an angle relative to the tire equator in a range of 25° or greater to 40° or less,
wherein a width of the reinforcement layer is 5 mm or greater to 80 mm or less.

2. The bias tire of claim 1, wherein the reinforcement layer is disposed across at least 70% of a shoulder inner surface area that, in a cross-sectional view in a tire width direction, is sandwiched between a tire inner surface position separated from a bead baseline outward in the tire radial direction by 20% of a tire cross-sectional height and a tire inner surface position corresponding to a tire width direction center between a tread ground contact edge and the tire equator.

3. The bias tire of claim 1, wherein a thickness of the reinforcement layer is 0.1 mm or greater to 5.0 mm or less.

4. The bias tire of claim 1, wherein the reinforcement layer comprises intersecting cords.

5. The bias tire of claim 1, wherein the reinforcement layer comprises parallel cords, and an extending direction of the cords differs from an extending direction of the tire circumferential edge on the inner side, in the tire radial direction, of the innermost ply.

6. A method for manufacturing a bias tire, the bias tire comprising:
a carcass, as a frame, made up of at least one ply extending between a pair of bead portions, a cord of the ply being inclined in a range of less than 90° relative to a tire equator;
a pair of sidewall portions on an outer side, in a tire radial direction, of the bead portions; and
a tread extending between the sidewall portions;
the method comprising, in order:
winding the carcass around a drum;
disposing a reinforcement layer, formed by a plurality of cords, so as to cover at least a portion of a tire circumferential edge on an inner side, in the tire radial direction, of an innermost ply of the carcass,
wherein the reinforcement layer is formed only in a tire half portion on a side where the tire circumferential edge on the inner side of the innermost ply is inclined in a way that a cord of a tire circumferential end on the inner side of the innermost ply moves away from the tire equator as the cord extends further in the tire circumferential direction towards the tire circumferential edge on the inner side of the innermost ply;
coating a surface, on a tire inner surface side, of the innermost ply and the reinforcement layer with a mold release agent; and vulcanizing a green tire after diameter expansion in a vulcanizer,
  wherein a cord of the innermost ply of the carcass extends at an angle relative to the tire equator in a range of 25° or greater to 40° or less,
  wherein a width of the reinforcement layer is set to be 5 mm or greater to 80 mm or less.

7. The method of claim 6, wherein the reinforcement layer is disposed across at least 70% of a shoulder inner surface area that, in a cross-sectional view in a tire width direction, is sandwiched between a tire inner surface position separated from a bead baseline outward in the tire radial direction by 20% of a tire cross-sectional height and a tire inner surface position corresponding to a tire width direction center between a tread ground contact edge and the tire equator.

8. The method of claim 6, wherein a thickness of the reinforcement layer is set to be 0.1 mm or greater to 5.0 mm or less.

9. The method of claim 6, wherein the reinforcement layer comprises intersecting cords.

10. The method of claim 6, wherein the reinforcement layer comprises parallel cords, and an extending direction of the cords differs from an extending direction of the tire circumferential edge on the inner side, in the tire radial direction, of the innermost ply.

* * * * *